(12) United States Patent
Nemeth et al.

(10) Patent No.: US 10,523,588 B2
(45) Date of Patent: Dec. 31, 2019

(54) TECHNIQUE FOR PROCESSING MESSAGES IN A MESSAGE-BASED COMMUNICATION SCENARIO

(71) Applicant: Telefonaktiebolaget LM Ericsson (publ), Stockholm (SE)

(72) Inventors: Gabor Nemeth, Budapest (HU); Zoltán Szeverényi, Szekesfehervar (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,139

(22) PCT Filed: Jul. 10, 2015

(86) PCT No.: PCT/EP2015/065831
§ 371 (c)(1),
(2) Date: Dec. 13, 2017

(87) PCT Pub. No.: WO2017/008830
PCT Pub. Date: Jan. 19, 2017

(65) Prior Publication Data
US 2018/0159795 A1    Jun. 7, 2018

(51) Int. Cl.
*H04L 12/927*    (2013.01)
*H04L 29/06*    (2006.01)
*H04L 12/861*    (2013.01)

(52) U.S. Cl.
CPC ........... *H04L 47/801* (2013.01); *H04L 49/90* (2013.01); *H04L 49/9084* (2013.01); *H04L 65/605* (2013.01)

(58) Field of Classification Search
CPC ... H04L 47/801; H04L 49/9084; H04L 49/90; H04L 65/605
See application file for complete search history.

(56) References Cited

U.S. PATENT DOCUMENTS

2005/0021836 A1*  1/2005  Reed ................ G06F 9/542
                                                    709/238
2006/0133278 A1*  6/2006  Hill ................. H04L 47/10
                                                    370/235

OTHER PUBLICATIONS

"Apache Camel", http://camel.apache.org/stream-caching.html, The Apache Software Foundation, 1-5.
"Apache Kafka—A distributed streaming platform", http://kafka.apache.org/, 2016.

(Continued)

*Primary Examiner* — Jackie Zuniga Abad
(74) *Attorney, Agent, or Firm* — Murphy, Bilak & Homiller, PLLC

(57) ABSTRACT

A technique for processing messages in a message-based communication scenario is described. In the communication scenario, messages are received from an input message stream, multiplied and forwarded to multiple message consumers, and persisted together with at least one of a time stamp and a message identifier in a persistent storage for later replay to the message consumers. A method aspect of this technique comprises detecting a replay triggering event associated with a message consumer. The method aspect further comprises, in response to detecting the replay triggering event, creating a replay function for the message consumer. The replay function is configured to receive persisted messages from the persistent storage and to send the persisted messages to the message consumer.

18 Claims, 5 Drawing Sheets

(56) References Cited

OTHER PUBLICATIONS

Sharma, Abhishek, "Apache Kafka: Next Generation Distributed Messaging System", http://www.infoq.com/articles/apache-kafka; XP055259104, Jun. 4, 2014, 1-21.

Unknown, "The Ultimate Shock Absorber—AMPS a real-time streaming analytic database built on a high-throughput, low-latency, expandable replay engine", URL:https://web.archive.org/web/20150321093236/http://www.crankuptheamps.com/downloads/documentation/AMPS-Ultimate-Shock-Absorber.pdf; XP055258974, Mar. 21, 2015, 1-9.

\* cited by examiner

TECHNIQUE FOR PROCESSING MESSAGES IN A MESSAGE-BASED COMMUNICATION SCENARIO

TECHNICAL FIELD

The present disclosure generally relates to processing of messages in a message-based communication scenario. The technique may be embodied in one or more of methods, computer program products, and devices.

BACKGROUND

Message-based communication streams are generally used in telecommunication networks, big data analytics frameworks, etc., to handle incoming data in real time. Specifically, in conventional systems, real time processing is done on each input message, and the message is dropped thereafter.

In normal operational circumstances a well-dimensioned system can cope with the input message rate. For temporarily buffering messages, a message queue may be provided. However, any unusual conditions such as temporary large delays in processing for a single message (e.g., due to some unexpected background waiting time, like database look-up) or failure/restart of a message processing element can result in input message queuing beyond the dimensioned queue sizes. In this case, the processing element will not receive some of the input messages at all. Such a situation may cause service disruption.

More generally, there are several reasons why a processing element may want to replay input messages that were transmitted on the stream at some past points in time. However, the nature of known message streams is such that they can only be read once; therefore such replaying is usually not possible.

SUMMARY

There is a need for a technique for processing messages in a message-based communication scenario, wherein the technique avoids one or more of the drawbacks discussed above or other problems. In particular, there is a need for providing replay capability, and to provide the replay capability in a consistent way.

According to a first aspect, a method for processing messages in a message-based communication scenario is presented in which messages are received from an input message stream, multiplied and forwarded to multiple message consumers, and persisted together with at least one of a time stamp and a message identifier in a persistent storage for later replay to the message consumers. The method comprises detecting a replay triggering event associated with a message consumer and, in response to detecting the replay triggering event, creating a replay function for the message consumer. The replay function is configured to receive persisted messages from the persistent storage and to send the persisted messages to the message consumer.

The method may be carried out, e.g., by a so-called "message broker", which is configured to manage the distribution of the messages of the input message stream. The message broker may be implemented as software running on a computing device. The computing device may be part of a (e.g., mobile) telecommunication network.

The method may be performed, e.g., by a server of a telecommunication network. The incoming message stream may originate, e.g., from a software element running on the device which carries out the method. A source for the input message stream may be a processing function inside an analytics framework performing the method itself. In particular, one of the message consumers may also provide an input message stream.

The input message stream may be provided by an external entity that feeds original data into the analytics framework. This external entity may, e.g., either be located on the same device as the device carrying out the method or the input message stream may be provided by an external entity being located on a different device, i.e., the input message stream may be provided by an external device. The external device may be part of the same network as the device carrying out the method.

The messages of the input message stream may be multiplied such that copies of the original messages are generated. One copy of each incoming message may be forwarded to a corresponding message consumer. The multiple message consumers may be non-replaying message consumers, i.e., message consumers which are currently not replaying persisted messages from the persistent storage. The forwarded messages may either be forwarded directly to the multiple message consumers or buffered in a corresponding message queue. For each one of the multiple message consumers, a corresponding message queue may be provided.

The incoming messages of the input message stream may be provided with a time stamp, wherein the time stamp indicates, e.g., the time of arrival of the corresponding message. Alternatively or additionally, each of the incoming messages of the input message stream may be provided with a message identifier (ID). In the following, the corresponding data (time stamp, message identifier, or combination of time stamp and message identifier) will be referred to as "identification data".

The identification data may be unique at least within the considered communication scenario. More precisely, the identification data may be unique, such that for each piece of identification data only one persisted message exists in the persistent storage. The time stamp and/or the message identifier may be stored together with the corresponding message. For example, the time stamp and/or the message identifier may be encapsulated within the corresponding message in the persistent storage. The persistent storage may be part of a memory of a computing device, which carries out the method. The persistent storage may comprise a volatile or non-volatile memory.

Detecting a replay triggering event may comprise, e.g., detecting a replay request sent from the corresponding message consumer. Additionally, or as an alternative, detecting a replay triggering event may comprise detecting an event generally associated with the respective message consumer, like, e.g., an end of a queue overrun of a message queue of the respective message consumer.

Creating a replay function for the message consumer may comprise creating a replay connector (e.g., a software element) associated with the message consumer. The replay function may be a software element which, when carried out, receives persisted messages from the persistent storage and sends the persisted message to the message consumer.

The message consumer may be a "replaying message consumer", i.e., a message consumer which currently replays messages from the persistent storage. The multiple message consumers, to which the messages are forwarded, may be "non-replaying message consumers". Each of the non-replaying message consumers may become a replaying message consumer when a replay triggering event associated with this message consumer is detected.

The method may further comprise receiving, by the replay function, a persisted message from the persistent storage and sending, by the replay function, the persisted message to the message consumer. The replay function may be a software element individually created for the respective message consumer. In other words, the replay function may be associated with the message consumer. The replay function may initiate that a particular persisted message is loaded from the persistent storage and sent to the message consumer. The persisted message may be identified by a time stamp and/or a message identifier.

Detecting the replay triggering event may comprise detecting a replay request from the message consumer. The replay request may be sent out by the message consumer. The replay request may be sent out by the message consumer when a particular message or a plurality of particular messages shall be replayed to the message consumer. The replay request may comprise information indicative of the message or the messages that shall be replayed by the message consumer. For example, the replay request may comprise a time stamp or a message identifier of a first message that shall be replayed by the message consumer. Here, the "first message" may correspond to a message that shall be replayed first, before subsequent messages are replayed. The replay request may also be indicative of all time stamps and/or message identifiers of the messages that shall be replayed by the message consumer.

A message queue may be provided for each of the multiple message consumers. The message queues may function as message buffers for the corresponding message consumers, for example, such that messages are stored in the message queue of a message consumer, when the message consumer is not ready yet to process the message (e.g., when it is busy processing a preceding message). The stored messages are then provided to the message consumer in the order they were received by the corresponding message queue.

The message queues may have a certain maximum storage limit, such that only a certain maximum amount of queued messages may be stored in each message queue. In case too many messages arrive at a certain message queue before the corresponding message consumer is able to process the older messages stored in the message queue, a queue overrun may occur.

A message queue may be provided for the non-replaying message consumers as well as for the replaying message consumers. Thus, also when replayed messages shall be provided to a certain message consumer from the persistent storage, these messages may be buffered in a corresponding message queue for the replaying message consumer. Therefore, both messages forwarded from the input message stream and messages sent from the persistent storage may be buffered by the message queues. Alternatively, message queues may only be provided for the non-replaying message consumers or for the replaying message consumers.

The method may further comprise detecting a queue overrun of the message queue of the message consumer and stopping message forwarding towards the message consumer if the queue overrun is detected. For example, detecting the queue overrun may comprise detecting a queue overrun notification transmitted by the message queue of the respective message consumer. The queue overrun may be detected when it is detected that a message storage of the message queue is full and cannot store any more incoming messages. As an example, a queue overrun may be detected after, for a certain time, the message stream into the message queue has been greater than the outgoing message stream of the message queue. After the message forwarding towards the message consumer has been stopped, there may be given enough time for the messages in the message queue to be processed.

Detecting the replay triggering event associated with the message consumer may comprise detecting that the queue overrun no longer occurs. Detecting the replay triggering event may comprise detecting a no-queue-overrun notification transmitted by the respective message queue. Detecting that the queue overrun no longer occurs may comprise detecting that all messages of the message queue have been processed, and, therefore that the message queue is empty. Detecting that the queue overrun no longer occurs may comprise detecting that an empty storage space of the message queue has exceeded a predefined threshold value. The predetermined threshold value may be chosen such, that under normal conditions, a queue overrun of the respective message queue will not occur.

The method may further comprise determining whether the persisted message sent to the message consumer is the last one persisted in the persistent storage and, if the persisted message is the last one persisted in the persistent storage, stopping and deleting the corresponding replay function for the message consumer. That a persisted message is the last one persisted in the persistent storage may mean that no newer messages are stored in the persistent storage. The last message persisted in the persistent storage may correspond to the message in the persistent storage having a time stamp indicating the latest time of all time stamps of the messages persisted in the persistent storage. Stopping and deleting the corresponding replay function for the message consumer may comprise deleting a software element associated with the corresponding replay function (a replay connector). Stopping and deleting the corresponding replay function for the message consumer may comprise to stop sending persisted messages from the persistent storage to the message consumer and to begin forwarding messages to the message consumer from the input message stream. In this case, the respective message consumer may turn from a replaying message consumer to a non-replaying message consumer.

Determining whether the persisted message sent to the message consumer is the last one persisted in the persistent storage may comprise comparing the at least one of a time stamp and a message identifier of the last message persisted in the persistent storage with the at least one of a time stamp and a message identifier of the persisted message sent to the message consumer. For carrying out this comparison, the time stamp and/or the message identifier of the last message persisted (i.e., stored) in the persistent storage may always be remembered (e.g., stored into a storage). If the compared pieces of identification data (time stamp, message identifier, or both) match each other, it may be determined that the persisted message sent to the message consumer is the last one persisted in the persistent storage. In that case, it is ensured that the corresponding message consumer has received the last message persisted into the persistent storage and, therefore, the message consumer has received a current message of the input message stream. The corresponding replay function for this message consumer is no longer needed and therefore may be stopped and deleted.

The replay function for the message consumer may be created with the identity of the message consumer and with the at least one of a time stamp and a message identifier of the first message that should be sent to the message consumer. The identity of the message consumer and the identification data of the first message that should be sent to the message consumer may, e.g., be stored as parameters of the replay function. When the replay function is started, these parameters may be read, such that a control logic carrying out the function knows, to which message consumer (or message queue) which messages shall be sent.

The method may further comprise receiving a connection request from a new message consumer, registering the new message consumer in a data structure, and forwarding the messages received from the input message stream to the new message consumer. The connection request may be transmitted by the new message consumer via a control channel. The connection request may be received by a control function (control connector). Registering the new message consumer in the data structure may comprise creating an entry for the new message consumer in a database. Registering the new message consumer may further mean, that the new message consumer subscribes to the messages of the input stream. The messages received from the input message stream are then forwarded to the new message consumer. In case a replay triggering event associated with the new message consumer is later detected, a replay function may also be created for the new message consumer.

The method may further comprise creating a message queue for the new message consumer. The functionality of the message queue of the new message consumer may be the same as the functionality of those of the other message consumers. In case the new message consumer cannot immediately process messages sent or forwarded to it, these messages may be stored in the corresponding message queue.

The method may further comprise assigning a sequence number to each message sent to each one of the multiple message consumers, wherein each of the sequence numbers is increased by one for each message sent to the respective message consumer. A message consumer can then detect message loss in case two subsequent messages received by this message consumer have sequence numbers differing by more than one. The message consumer, which has detected message loss, may transmit a replay request, e.g., via a control channel.

According to a second aspect, a computer program product is described herein comprising program code portions for performing the steps of any of the methods described herein, when the computer program product is executed on one or more computing devices. The computer program product may be stored on a computer-readable storage medium, or may be provided for download via a computer network (e.g., the Internet or a proprietary network).

The computer program product may be stored on a computer-readable storage medium. The computer-readable storage medium may be, e.g., a CD-ROM, DVD, or semiconductor memory.

According to a second aspect, a device for processing messages in a message-based communication scenario in which messages are received from an input message stream, multiplied and forwarded to multiple message consumers, and persisted together with at least one of a time stamp and a message identifier in a persistent storage for later replay to the message consumers, is provided. The device comprises a processor and a memory, the memory containing instructions executable by the processor. When the instructions are carried out, the processor detects a replay triggering event associated with a message consumer and, in response to detecting the replay triggering event, creates a replay function for the message consumer. The replay function is configured to receive persisted messages from the persistent storage and to send the persisted messages to the message consumer.

The device may be, e.g., a server of a network node of a (mobile) communication network. The device may further be a component of such a server. The device may be communicatively coupled to one or more other devices via a network. Messages for the message consumers may be transmitted via the network. Alternatively, or additionally, communication data may be transmitted over the network. For receiving incoming data (e.g., messages) and for transmitting outgoing data (e.g., messages), the device may comprise an input/output interface. The device may be configured to carry out any of the methods described therein. In particular, the device may comprise a software element executed by the processor, which may be referred to as a "message broker".

The device may further comprise a message queue for each of the multiple message consumers. The message queues may be implemented in respective storage areas of the memory of the device.

The device may further comprise a control function configured to receive a replay request from the message consumer. The control function may be implemented as a software element stored on the memory and executed by the processor.

The control function may further be configured to receive a connection request from a new message consumer, wherein the processor is configured to register the new message consumer in a data structure and to forward the messages received from the input message stream to the new message consumer. The connection request may be sent from the new message consumer over a control channel. A control channel may be provided for each message consumer, i.e., also for the new message consumer. The data structure may be stored on the memory of the device, e.g., in the form of a database.

The control function may further be configured to create a message queue for the new message consumer. The message queue for the new message consumer may be stored on the memory of the device. For example, creating a message queue for the new message consumer may comprise assigning a predetermined storage area of the memory to the new message consumer.

According to a fourth aspect, a system for processing messages in a message-based communication scenario is provided. The system comprises any of the devices described herein and at least the message consumer.

The message consumer may be provided as an external entity with regard to the device. The device and the message consumer may be communicatively coupled, e.g., via a network. The device and the message consumer may exchange, e.g., messages and/or replay requests. At least one internal message consumer may be provided internally within the device. The message consumers may be implemented as software elements. Each of the message consumers may both receive and transmit messages from and to the input message stream. Further, one or more of the message consumers may only receive messages (i.e., messages forwarded from the input message stream and persisted messages sent from the persistent storage).

The message consumer may be configured to provide messages to at least one of the input message stream and a further input message stream. As described above, the message consumer may not only receive messages from the input message stream but also by itself provide messages to an input message stream. The further input message stream may be another input message stream providing messages to be processed by the message consumers.

BRIEF DESCRIPTION OF THE DRAWINGS

Embodiments of the technique presented herein are described below with reference to the accompanying drawings, in which.

DETAILED DESCRIPTION

In the following description, for purposes of explanation and not limitation, specific expressions will be used (such as message broker, message consumer, input message stream, persistent storage, source connector, replay connector, control connector, broker logic, and message queue) in order to provide a thorough understanding of the technique presented herein. It will be apparent to one skilled in the art that these expressions are generic terms for a variety of different possible implementations. For example, each of these elements may be realized by a corresponding software element running on a processor of a device. Instructions for performing these software elements may be stored on a memory of the device. Further, all or some of these elements may be realized by software elements running on different devices, wherein these devices are communicatively coupled, such that data exchange between the devices is possible. Further, all or some of these elements may be realized by individual hardware elements and/or devices. The described elements may also be realized by a combination of software and hardware elements.

In general, those skilled in the art will appreciate that the services, functions and steps explained herein may be implemented using software functioning in conjunction with a programmed micro-processor, or using an Application Specific Integrated Circuit (ASIC), a Digital Signal Processor (DSP), a Field Programmable Gate Array (FPGA) or general purpose computer. It will also be appreciated that while the following embodiments are described in the context of methods and devices, the technique presented herein may also be embodied in a computer program product as well as in a system comprising a processor and a memory coupled to the processor, wherein the memory is encoded with one or more programs that execute the services, functions and steps disclosed herein.

Figure 1:
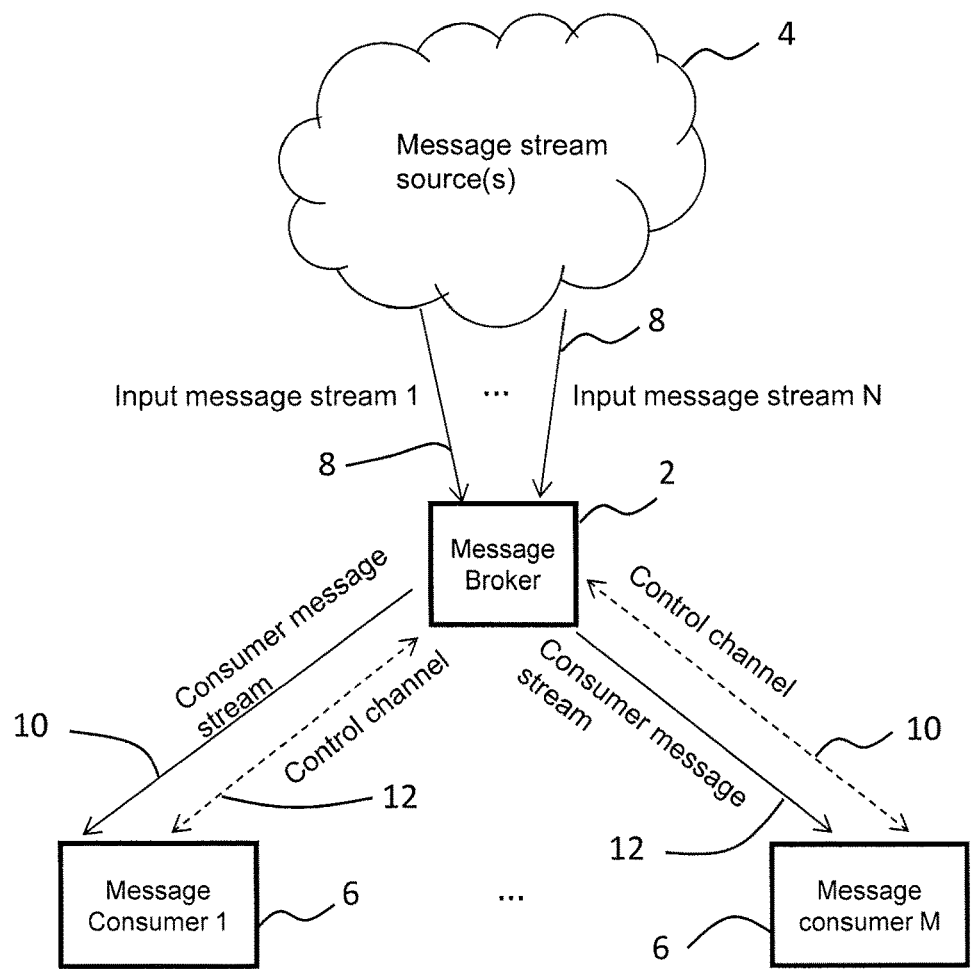
FIG. 1 shows a schematic block diagram of a message-based communication scenario in accordance with an aspect of this disclosure.

FIG. 1 illustrates a message-based communication scenario in which message processing aspects presented herein can be implemented. The communication scenario comprises a message broker 2 implemented as a man-in-the-middle node between at least one message stream source 4 and at least one message consumer 6. An example of a system benefiting from the message broker is, e.g., a real-time big data analytics framework where processing functions exchange (intermediate and final) results via data messages. Message stream sources 4 are then one or both of a) external entities that feed original data into the analytics, and b) the processing functions (i.e., the message consumers 6) inside the analytics themselves. Likewise message consumers 6 are then consumers as well as providers of a message stream. In other words, message consumers 6 may at the same time function as message stream sources 4. Alternatively, at least some of the message consumers 6 may only receive messages and not transmit messages to the analytics.

The message stream sources 4 may provide at least one input message stream 8. For example, one input message stream 8 per message stream source 4 may be provided. Via the input message streams 8, messages are transmitted to the message broker 2. In conventional systems, the message broker 2 would not be present and the message consumers 6 would directly subscribe to the input message streams 8 from the message stream sources 4. However, according to the present disclosure, the message broker 2 is provided and the message consumers 6 subscribe to messages transmitted by the message broker 2. Thus, the message broker 2 can process messages, multiply messages, buffer messages, and/or distribute messages to the respective message consumers 6. The message consumers 6 (the processing functions) may subscribe for data provided by external data sources or by other message consumers 6 (processing functions), such that both external data sources and message consumers 6 may be regarded as message stream sources 4.

The message broker 2 subscribes to one or more input message streams 8, persists arriving messages for further replays, and forwards all messages to any non-replaying message consumers 6 via a corresponding consumer message stream 10.

As will be discussed below in further detail, each of the message consumers 6 may either currently be a non-replaying message consumer 6 or a replaying message consumer 6. Non-replaying message consumers 6 are message consumers 6 in a normal operating node, which are capable of immediately handling and processing incoming messages via the consumer message stream 10. Other message consumers 6 may currently be replaying message consumers 6, which means that messages are not directly forwarded to these message consumers 6 by the message broker 2 but instead, persisted messages from a persistent storage 22 are sent to these replaying message consumers 6. The status of the message consumers 6 may change from non-replaying to replaying and back, based on the prevailing situation. As described below, there are several situations (e.g., a queue overrun), which make it necessary for a message consumer 6 to change from non-replaying to replaying mode.

Each message received by the broker 2 is provided with at least one of a time stamp or a message identifier. The time stamp and/or the message identifier is/are stored together with the received messages in the persistent storage 22. The time stamp may indicate a time at which the message broker 2 has received the respective message from the input message stream 8. The message identifier (ID) may be a value assigned to each message, wherein each value is unique at least within the communication scenario (e.g., within the analytics framework). By providing unique time stamps and/or message identifiers, messages persisted in the persistent storage 22 may later be identified and individually retrieved form the persistent storage 22.

Message consumers 6 subscribe to the consumer message stream 10 provided by the message broker 2 instead of the original input message streams 8. At any time after subscription, a message consumer 6 may request replaying of messages starting from some earlier time stamp and/or message identifier. In that case, the respective message consumer 6 turns from a non-replaying message consumer 6 into a replaying message consumer 6. Replay requests are communicated through logically or physically separate control channels 12 toward the message broker 2.

For each message consumer 6, a corresponding consumer message stream 10 and a corresponding control channel 12 may be provided. The control channels 12 may allow bi-directional data transfer, such that information may be transferred from the message broker 2 to the message consumer 6 and from the message consumer 6 to the message broker 2. The control channels 12 may be used for the exchange of several different control messages between the message broker 2 and the message consumer 6.

Although in FIG. 1 only two input message streams 8 and only two message consumers 6 are shown, an arbitrary number N of input message streams 8 and an arbitrary number M of message consumers 6 may be provided. At each point in time, a plurality of non-replaying message consumers 6 and a plurality of replaying message consumers 6 may be provided.

Figure 2:
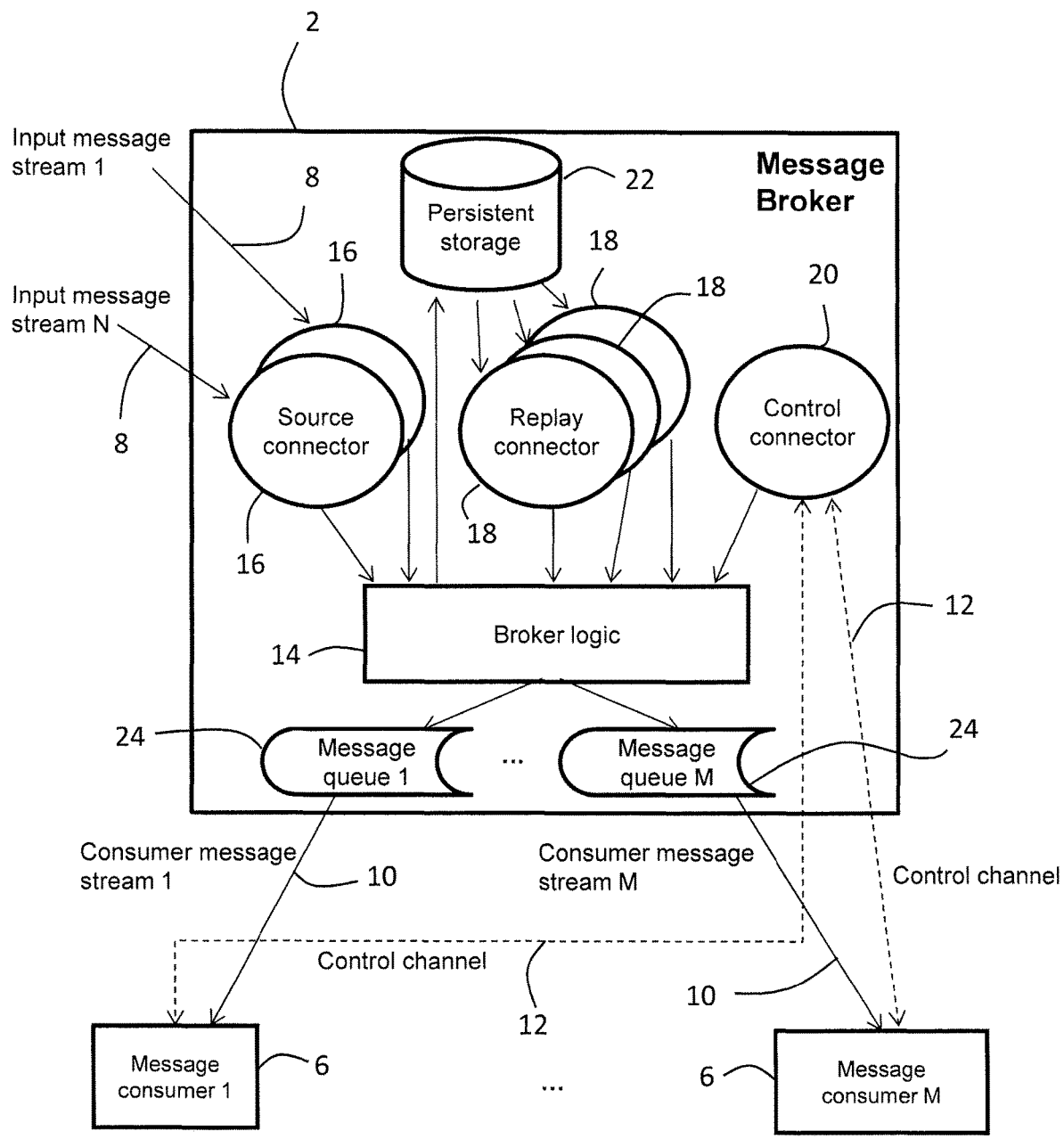
FIG. 2 shows a schematic block diagram including details of the message broker in accordance with an aspect of this disclosure.

FIG. 2 shows a block diagram of the message broker 2 and two exemplary message consumers 6 (wherein in fact, an arbitrary number M of message consumers 6 may be provided). In FIG. 2 further details of the message broker 2 are displayed. In particular, the message broker 2 may comprise a plurality of internal elements, such as so-called connectors. These internal elements may be implemented as software elements (e.g., logical elements, objects, program routines, etc.). Further, the entire message broker 2 may be implemented as software running on a processor of a computing device. Some of the elements of the message broker 2 shown in FIG. 2 may also be fully or partially implemented by a memory of the computing device (such as, e.g., the persistent storage 22). Further, some of the elements of the message broker depicted in FIG. 2 may be provided on separate devices or in a virtualized manner, such that these separate devices in combination or the virtualization comprise the message broker 2 shown in FIG. 2.

As shown in FIG. 2, the message broker 2 comprises a single main function, namely the broker logic 14. The broker logic 14 coordinates all other functions and, therefore, may be regarded as a controller or a control logic. Further, the message broker 2 comprises three types of connectors: source connectors 16, replay connectors 18, and a control connector 20. Each of these connectors 16, 18, and 20 may be regarded as comprising an interface to another element of the communication scenario. Each of the connectors 16, 18, and 20 may be implemented as a (software) function and/or a software element. Hence, in this disclosure, the source connectors 16 are also referred to as source function, the replay connectors 18 are also referred to as replay functions and the control connector 20 is also referred to as control function.

Further, a persistent storage 22 is provided for persisting messages received by the source connectors 16. The persistent storage 22 may use, e.g., a part of a memory (e.g., hard drive, SSD, or RAM) of a device on which the message broker 2 is implemented. Further, optionally, an output message queue 24 may be provided for each of the message consumers 6. Alternatively, message queues 24 may only be provided for some or none of the message consumers 6. The message queues 24 may use a part of a memory of a device on which the message broker 2 is implemented, wherein individual memory areas may have been assigned for the individual message queues 24.

As shown in FIG. 2, the message consumers 6 receive messages from the message broker 2 (optionally via the message queues 24) over the consumer message stream 10. Further, a control channel 12 is provided between the control connector 20 and each of the message consumers 6.

One source connector 16 is provided per input message stream 8, wherein each of the source connectors 16 receives messages from a corresponding input message stream 8. In other words, each source connector 16 is configured to receive messages from a corresponding input message stream 8.

Input messages received by the source connectors 16 from the input message streams 8 are persisted in the persistent storage 22 in the order of their reception. This order does not change. The messages are stored in the persistent storage 22 together with a reception time stamp and/or a message identifier. The time stamp, the message identifier, or at least the combination of time stamp and message identifier is unique within the regarded message broker 2. Hence, the stored identification data (time stamp, message identifier, or combination of time stamp and message identifier) allows a unique identification of messages persisted in the persistent storage 22. Although only one persistent storage 22 is shown in FIG. 2, this number is not limiting and a plurality of persistent storages 22 may be provided, e.g., one persistent storage per source connector 16. The persistent storage 22 may be distributed over more than one physical storage medium.

The control connector 20 is connected to each consumer 6 via a corresponding control channel 12. The control connector 20 accepts subscription requests and message replay requests from the message consumers 6. Further, other control messages may be exchanged between the message broker 2 and the consumers 6 via the control channels 12 and the control connector 20. Upon receiving a connection request or replay request from a message consumer 6, a special message is made available by the control connector 20 to the broker logic 14 describing the request details. Although in FIG. 2 only one control connector 20 is shown, this number is not limiting and, e.g., one control connector may be provided for each message consumer 6. In the embodiment of FIG. 2, only one control connector 20 is provided, wherein this control connector 20 is configured to receive and to process control messages (e.g., connection requests and replay requests) from all message consumers 6.

One replay connector 18 is provided for each active replay, i.e., for each replaying message consumer 6. Hence, the number of replay connectors 18 may be zero if no message consumer 6 is currently replaying messages from the persistent storage 22 (when there is no replaying message consumer 6). Only exemplarily, three replay connectors 18 are shown in FIG. 2. However, as described above, this number may vary based on the current number of replaying message consumers 6. When a message consumer 6 requests a replay, it sends a replay request to the control connector 20 and a replay connector 18 is created with the identity of the corresponding message consumer 6 and identification parameters of the first message that shall be replayed (time stamp and/or message identifier). The replay connectors 18 read messages from the persistent storage 22 in the stored order and make them available to the broker logic 14 in that order.

The replay may end when it is determined that the corresponding message consumer 6 has received the last message persisted into the persistent storage and, therefore, the message consumer 6 has received a current message of the input message stream 8. The corresponding replay connector 18 for this message consumer 6 is then no longer needed and therefore may be stopped and deleted.

The broker logic 14 is connected to the source connectors 16, the replay connectors 18, the control connector 20, and the persistent storage 22. Further, the broker logic 14 is connected to the message queues 24 or, if no message queues 24 are provided, directly to the message consumers 6. The broker logic 14 may be regarded as control logic, which controls the operation of the message broker 2.

In a normal operation mode, the broker logic 14 controls the message broker 2 such that incoming messages received from the input messages streams 8 by the source connectors 16 are persisted in the persistent storage 22 together with a time stamp and/or a message identifier. Further, the incoming messages are multiplied and forwarded to each message consumer 6, which is not currently in a replaying mode. In other words, messages are only forwarded to non-replaying message consumers 6 and not to replaying message consumers 6. Further, when a replay request is sent from one of the message consumers 6 to the control connector 20 of the message broker 2, the broker logic 14 initiates that a new replay connector 18 is created for this message consumer 6 and the corresponding message consumer 6 turns from a non-replaying message consumer 6 to a replaying message consumer 6. Messages are then retrieved from the persistent storage 22 in the same order they were stored into the persistent storage 22 and sent to the replaying message consumer 6 by the newly created replay connector 18. In its replay request, the message consumer 6 may indicate, which messages shall be replayed. More precisely, the message consumer 6 may indicate in its replay request a time stamp and/or a message ID of the first message that shall be replayed.

As said, a dedicated message queue 24 may be provided between the broker logic 14 and each message consumer 6. The message queues 24 function as message buffers for temporarily storing messages in case that the corresponding message consumer 6 is not able to immediately process the messages.

New message consumers 6 that wish to subscribe to the output of the message broker 2 may send a connection request to the control connector 20 of the message broker 2.

Figure 3:
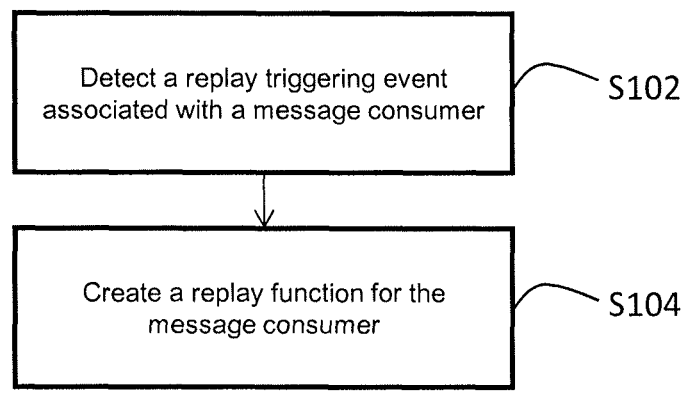
FIG. 3 shows a schematic flow chart of a method for processing messages in a message-based communication scenario in accordance with an aspect of this disclosure.

FIG. 3 shows a flow chart of a method that may be carried out, e.g., by the broker logic 14 of the message broker 2 shown in FIG. 2 or any other device.

In a first step S102, a replay triggering event associated with a message consumer 6 is detected. For example, the replay triggering event may be that one of the message consumers 6 sends a replay request to the control connector 20. Such a replay request may be sent by one of the message consumers 6 for example after message loss has been detected by the corresponding message consumer 6. There are several situations, in which it might be necessary for a message consumer 6 to replay certain messages that previously have been transmitted over the input message streams 8. For example, the replay triggering event may also be detected after a queue overrun of one of the message queues 24 has been detected and when the queue overrun no longer occurs.

In a second step S104 a replay function (a replay connector 18) is created for the message consumer 6. It is to be noted that the replay connector 18 is individually created for the message consumer 6, for which a replay triggering event has been detected. Therefore, a plurality of replay connectors 18 may exist, wherein each replay connector 18 provides different messages to respective message consumers 6. At the same time, the message broker 2 is able to forward incoming messages to message consumers 6, which are currently not in a replaying mode (non-replaying message consumers 6).

By individually creating replay connectors 18 for each replaying message consumer 6, a flexible way of replaying messages is provided. Each message consumer 6 may be addressed individually such that messages may be sent individually to each message consumer 6. Hence, it may be decided for each message consumer 6, which messages shall be replayed by the message consumer 6 and therefore, it can be avoided to send redundant messages to message consumers 6 (which they already received). Therefore, both time and computing power may be saved. Further, by creating and deleting replay connectors 18 depending on requirements, only the used replay connectors exist in a working memory of the device carrying out the method. Hence, memory may be saved.

Figure 4:
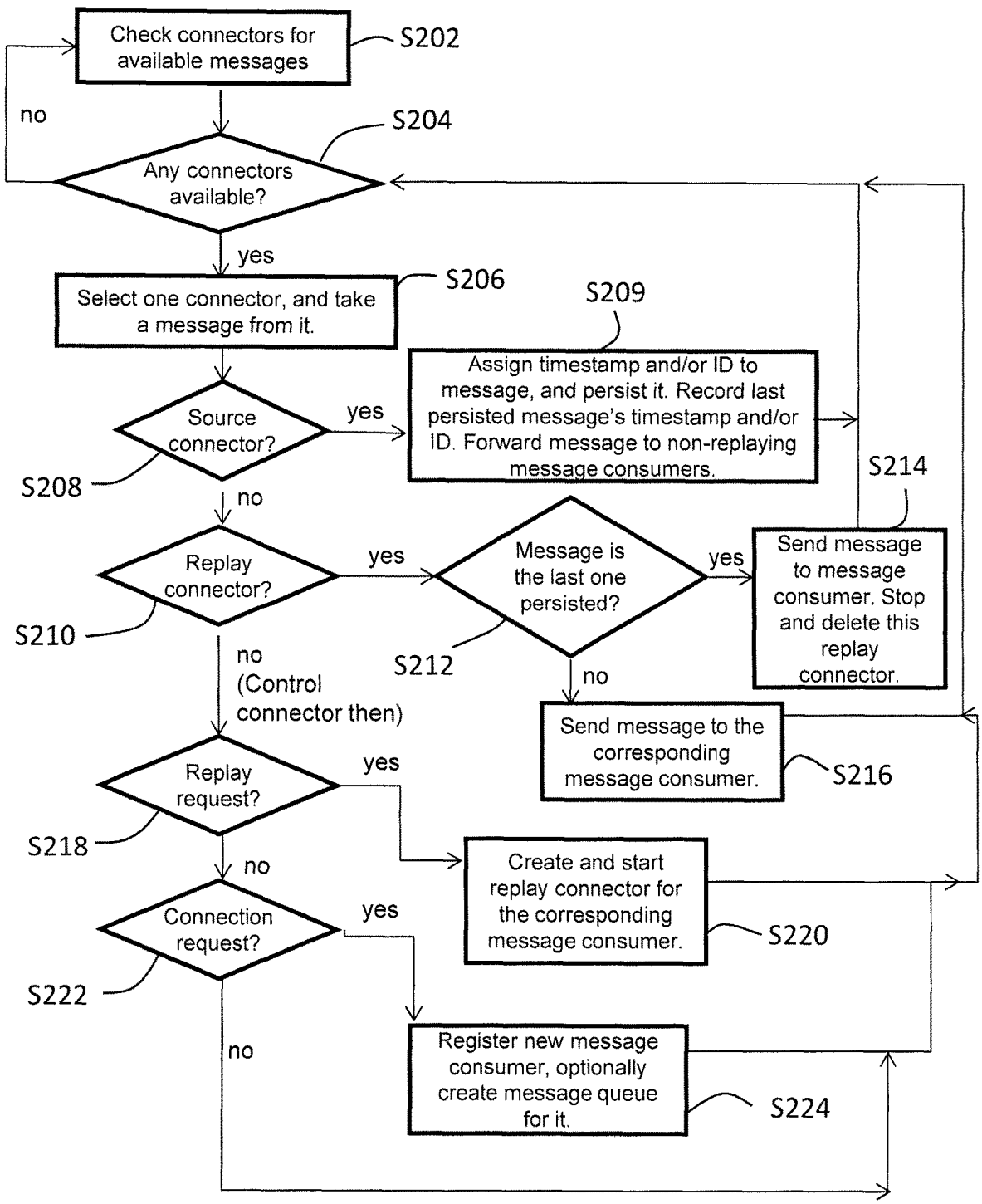
FIG. 4 shows a schematic flow chart of a method for processing messages in a message-based communication scenario in accordance with an aspect of this disclosure.

FIG. 4 shows a flow chart of a more detailed method that may be performed by the broker logic 14 of the message broker 2. The broker logic 14 executes the described method shown in FIG. 4 in an iterative loop (e.g., as round-robin scheduling). On every iteration, all connectors (in particular, the source connectors 16, the replay connectors 18, and the control connector 20) are checked for available messages (S202). If no connectors are available, i.e., if no messages are available, (S204), the method returns to step S202. Connectors that have available messages are all processed one by one, in no particular order. Processing of one connector is as follows:

The next available message is taken from the connector (S206). If the connector from which the message is taken is a source connector 16 (S208), then the message is time stamped and/or provided with a message ID, and persisted in the persistent storage 22. The time stamp and/or the message ID of the last persisted message is remembered (i.e., stored in a memory). Further, the message is multiplied and sent to all non-replaying message consumers 6 (S209). If the connector from which the message is taken is a replay connector (S210), it is checked whether the message is the last message persisted in the persistent storage 22 (S212). Therefore, the time stamp and/or message identifier of the message is compared with the remembered time stamp and/or message ID of the last message persisted in the persistent storage 22. If the compared identification data (time stamp, message identifier, or both) matches, i.e., if the message is the last message persisted in the persistent storage 22 ("yes"), then the message is sent to the message consumer 6 corresponding to the replay connector 18 and this replay connector 18 is deleted.

Otherwise, if the message is not the last message persisted in the persistent storage 22 ("no"), the message is sent to the message consumer 6 corresponding to the replay connector 18 from which the message is taken (S216). The replay connector 18 is maintained in this case. If the connector from which the message is taken is not a source connector 16 and not a replay connector 18, then it is determined that the corresponding connector is the control connector 20. If the message comprises a replay request (S218), a replay connector 18 is create for the corresponding message consumer 6 and this replay connector 18 is started (S220). If the message from the control connector 20 is a connection request (S222), then the new message consumer 6 is registered in a data structure of the message broker 2 (S224). Optionally, a message queue 24 is created for the new message consumer 6.

Further, if a message could not be forwarded to some of the message consumers 6 or if a queue overrun of one of the message queues 24 is detected, a replay connector 18 is created for the corresponding message consumer 6 and the replay connector 18 starts to send messages to the corresponding message consumer 6 when the queue overrun is no longer detected or when the message consumer 6 is able again to receive messages. This situation is not shown in FIG. 4 but is similar to steps S218 and S220.

Optionally, outgoing messages sent to the message consumers 6 can be given a sequence number per message consumer 6, wherein this sequence number is increased by one for each message sent to the corresponding message consumer 6. Message consumers 6 are then able to detect message loss if sequence numbers increased by more than one between two consecutive received messages. Implementation may include that the message consumer 6 and the message broker 2 use a custom header or encapsulation. For example, in case that one of the message consumers 6 has detected message loss, a replay request may be sent to the control connector 20 of the message broker 2.

Optionally, multiple instances of the message broker 2 can be installed after one another, including use cases of multiple levels of source stream aggregation, or to duplicate message persisting functionality in different physical elements.

Figure 5:
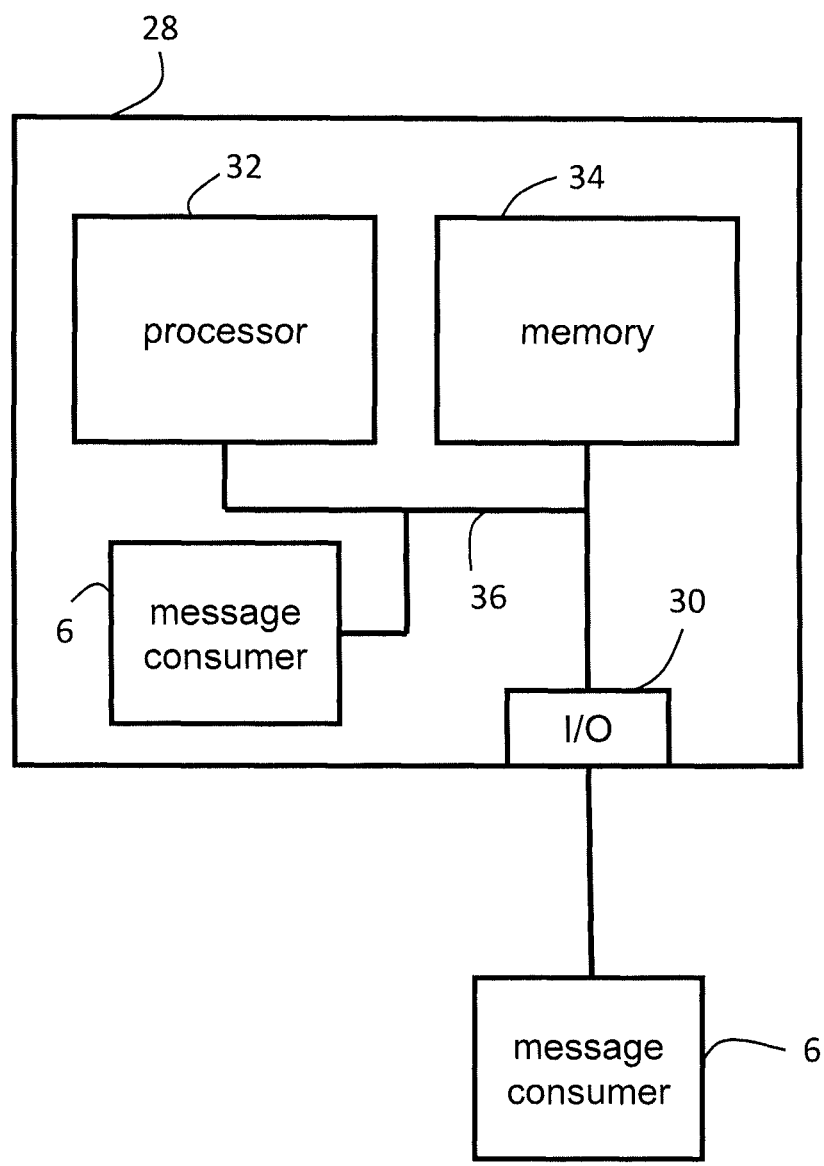
FIG. 5 shows a schematic block diagram of a device for processing messages in a message-based communication scenario in accordance with an aspect of this disclosure.

FIG. 5 shows a block diagram of a system 26 for processing messages in a message-based communication scenario, wherein the system 26 is configured to carry out any of the methods described herein. The system 26 comprises a device 28 and a message consumer 6 connected to an input/output interface 30 of the device. The message consumer 6 connected to the input/output interface 30 is herein referred to as a "external message consumer" 6.

The system 26 shown in FIG. 5 may be, e.g., part of a telecommunication network and, in particular, part of a real time big data analytics framework where processing functions exchange (intermediate and final) results via data messages. The device 28 may be a computing device comprising a processor 32 and a memory 34. For example, the device 28 may be a server of a network node, a general purpose computer (e.g., a personal computer), or any other computing device configured to carry out the methods described herein. Processing functions of the system 26 communicate via messages, wherein message consumers 6 may be external message consumers 6 connected to the input/output interface 30 of the device 28. Further, internal message consumers 6 may be provided within the device 28 and connected to the processor 32 and the memory 34 via a bus 36. Additionally or alternatively, further message consumers 6 may be implemented as software elements (e.g., internal objections or functions) of a software stored in the memory 34 and/or running on the processor 32. Any of these external message consumers 6, internal message consumers 6, and further message consumers 6 may represent any of the message consumers 6 shown in FIGS. 1 and 2.

On the memory 34, instructions are stored, which perform the function of the message broker 2 shown in FIG. 1 or FIG. 2. In particular, the device 28 is configured to carry out the methods shown in FIG. 3 and/or FIG. 4.

The elements of the message broker 2 shown in FIG. 2 are realized by the processor 32 and the memory 34 of the device 28. For example, the persistent storage 22 and the message queues 24 may be implemented as part of the memory 34. Further, the broker logic 14 may be a control program running on the processor 32. Additionally or alternatively, some of the elements of the message broker 2 shown in FIG. 2 may be realized as individual hardware elements of the device 28.

The bus 36 communicatively couples the processor 32, the memory 34, the internal message consumer 6 (if present) and the input/output interface 30 (if present). Data (e.g., messages) may be exchanged between these elements by the bus 36.

With the technique disclosed herein, it is possible to provide replay capability such that messages arrive at the replaying message consumers 6 in the same order on every replay as they did on the first time at the source connectors 16. Further, multiple message consumers 6 (non-replaying message consumers 6) can read the same input message stream, because the messages are multiplied and forwarded to the non-replaying message consumers 6.

The present technique provides the combined capability of multiplication of the input message stream(s) 8 towards different (non-replaying) message consumers 6 with per-reader message replay capability and total ordering of messages. Thus, each of the message consumers 6 can individually receive replayed messages in the correct order.

The present technique provides consistent output ordering, multiple consumers and per-consumer message playback, output block detection due to message consumer blocking, multiple input source aggregation, message loss detection, and persisting messages to e.g., disk files.

It is believed that the advantages of the technique presented herein will be fully understood from the forgoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only be the scope of the claims that follow.

The invention claimed is:

1. A computerized method for processing messages received from an input message stream, multiplied and forwarded to a plurality of message consumers, and stored together with at least one of a time stamp and a message identifier in a persistent storage for later replay to the message consumers, the method comprising:
   detecting a replay triggering event associated with a particular one of the message consumers, wherein the particular message consumer is associated with a corresponding sequence number;
   in response to detecting the replay triggering event:
      creating a replay function for the particular message consumer, wherein the replay function for the particular message consumer is created with the identity of the particular message consumer and with the at least one of a time stamp and a message identifier of the first message that should be sent to the particular message consumer;
      configuring the replay function to retrieve stored messages from the persistent storage and send the retrieved messages to the particular message consumer via a message queue for the particular message consumer; and
      incrementing the corresponding sequence number, by one, for each message sent to the particular message consumer;
   detecting an occurrence of an overrun of the message queue for the particular message consumer; and in response to detecting the occurrence of the overrun, stopping message forwarding towards the particular message consumer.

2. The method of claim 1, further comprising:
retrieving, by the replay function, a stored message from the persistent storage; and
sending, by the replay function, the retrieved message to the particular message consumer.

3. The method of claim 2, wherein the replay function sends the retrieved message to the message queue for the particular message consumer.

4. The method claim 1, wherein detecting the replay triggering event comprises detecting a replay request from the particular message consumer.

5. The method of claim 1, wherein detecting the replay triggering event associated with the particular message consumer comprises detecting an end of an overrun of the message queue for the particular message consumer.

6. The method of claim 1, further comprising
determining whether the retrieved message sent to the particular message consumer is the last one stored in the persistent storage; and
if the retrieved message is the last one stored in the persistent storage, stopping and deleting the corresponding replay function for the particular message consumer.

7. The method of claim 6, wherein determining whether the retrieved message sent to the particular message consumer is the last one stored in the persistent storage comprises: comparing the at least one of a time stamp and a message identifier of the last message stored in the persistent storage with the at least one of a time stamp and a message identifier of the retrieved message sent to the particular message consumer.

8. The method of claim 1, further comprising
receiving a connection request from a further one of the message consumers;
registering the further message consumer in a data structure; and
forwarding the messages received from the input message stream to the further message consumer.

9. The method of claim 8, further comprising: creating a message queue for the further message consumer.

10. A non-transitory, computer-readable medium storing computer-executable instructions that, when executed by at least one processor, configures a device to perform operations corresponding to the method of claim 1.

11. A device configured to process messages received from an input message stream, multiply and forward to a plurality of message consumers, and store together with at least one of a time stamp and a message identifier in a persistent storage for later replay to the message consumers, the device comprising:
at least one processor; and
at least one memory storing executable instructions that, when executed by the at least one processor, configure the device to:
detect a replay triggering event associated with a particular one of the message consumers, wherein the particular message consumer is associated with a corresponding sequence number;
in response to detecting the replay triggering event:
create a replay function for the particular message consumer, wherein the replay function for the particular message consumer is created with the identity of the particular message consumer and with the at least one of a time stamp and a message identifier of the first message that should be sent to the particular message consumer;
configure the replay function to retrieve stored messages from the persistent storage and send the retrieved messages to the particular message consumer via a message queue for the particular message consumer; and
increment the corresponding sequence number, by one, for each message sent to the particular message consumer;
detect an occurrence of an overrun of the message queue for the particular message consumer; and
in response to detecting the occurrence of the overrun, stop message forwarding towards the particular message consumer.

12. The device of claim 11, wherein execution of the instructions configures the device to detect the replay triggering event based on detecting an end of an overrun of the message queue for the particular message consumer.

13. The device of claim 11, wherein execution of the instructions further configures the device to receive a replay request from the particular message consumer.

14. The device of claim 13, wherein execution of the instructions further configures the device to: receive a connection request from a further message consumer; register the further message consumer in a data structure; and forward the messages received from the input message stream to the further message consumer.

15. The device of claim 14, wherein execution of the instructions further configures the device to create a message queue for the further message consumer.

16. A system for processing messages received from an input message stream, the system comprising: the device of claim 11; and at least the particular message consumer.

17. The system of claim 16, wherein the particular message consumer is configured to provide messages to at least one of: the input message stream and a further input message stream.

18. The device of claim 11, wherein the replay function for the particular message consumer is created based on the identity of the particular message consumer and on the at least one of the time stamp and the message identifier.

* * * * *